(12) United States Patent
Wing et al.

(10) Patent No.: US 8,533,462 B2
(45) Date of Patent: *Sep. 10, 2013

(54) VERIFYING CRYPTOGRAPHIC IDENTITY DURING MEDIA SESSION INITIALIZATION

(75) Inventors: Daniel G. Wing, San Jose, CA (US); Cullen F. Jennings, Santa Cruz, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/493,302

(22) Filed: Jun. 11, 2012

(65) Prior Publication Data

US 2012/0246467 A1    Sep. 27, 2012

Related U.S. Application Data

(63) Continuation of application No. 11/770,226, filed on Jun. 28, 2007, now Pat. No. 8,200,959.

(51) Int. Cl.
*H04L 29/06* (2006.01)

(52) U.S. Cl.
USPC ........... 713/156; 713/157; 713/176; 713/177; 713/180; 709/204; 709/227; 455/41.1; 340/425.5; 340/438; 380/30; 380/286

(58) Field of Classification Search
USPC ......... 713/156–158, 176–177, 180; 709/204, 709/227; 455/41.1; 340/425.5, 438; 380/30, 380/286
See application file for complete search history.

(56) References Cited

U.S. PATENT DOCUMENTS

| | | | |
|---|---|---|---|
| 4,264,782 A | 4/1981 | Konheim | |
| 5,533,051 A | 7/1996 | James | |
| 5,813,011 A | 9/1998 | Yoshida et al. | |
| 5,963,909 A | 10/1999 | Warren et al. | |
| 6,148,082 A | 11/2000 | Slattery et al. | |
| 6,226,383 B1 | 5/2001 | Jablon | |
| 6,532,121 B1 | 3/2003 | Rust et al. | |
| 6,744,785 B2 | 6/2004 | Robinett et al. | |
| 6,768,818 B2 | 7/2004 | Friederich et al. | |
| 6,791,975 B1 | 9/2004 | Aktas et al. | |
| 6,831,969 B2 | 12/2004 | Ju | |
| 6,920,154 B1 | 7/2005 | Achler | |
| 6,996,717 B2 | 2/2006 | Yin et al. | |
| 7,020,284 B2 | 3/2006 | Boykin et al. | |

(Continued)

OTHER PUBLICATIONS

USPTO, Office Action for U.S. Appl. No. 11/848,650 in the name of Chris A. Dunn; 15 pages, Dec. 30, 2010.

(Continued)

*Primary Examiner* — Thanhnga B Truong
(74) *Attorney, Agent, or Firm* — Baker Botts L.L.P.

(57) ABSTRACT

An authentication agent may cryptographically identify a remote endpoint that sent a media initialization message even though intermediate devices may modify certain fields in the message after a signature is inserted. The originating endpoint's agent may create the signature over some fields of the message using an enterprise network's private key. The agent may insert the signature into the message and send the message to a recipient endpoint's authentication agent. The recipient agent may verify the signature, receive a certificate including a second public key, and challenge the identity of the originating endpoint in order to confirm that identity. This challenge may request a confirmation that the originating endpoint knows the private key corresponding to the second public key and may occur while running encrypted media at the endpoints. After the originating endpoint is authenticated, the endpoints may exchange encrypted and/or unencrypted media.

21 Claims, 4 Drawing Sheets

(56) References Cited

U.S. PATENT DOCUMENTS

| | | |
|---|---|---|
| 7,062,048 B2 | 6/2006 | Livaditis et al. |
| 7,124,303 B2 | 10/2006 | Candelore et al. |
| 7,131,004 B1 | 10/2006 | Lyle |
| 7,140,036 B2 | 11/2006 | Bhagavatula et al. |
| 7,143,095 B2 | 11/2006 | Barrett et al. |
| 7,151,832 B1 | 12/2006 | Fetkovich et al. |
| 7,283,904 B2 | 10/2007 | Benjamin et al. |
| 7,342,966 B2 | 3/2008 | Lepine et al. |
| 7,562,213 B1 | 7/2009 | Timms |
| 2002/0085734 A1 | 7/2002 | Keeney et al. |
| 2003/0217165 A1 | 11/2003 | Buch et al. |
| 2004/0237110 A1 | 11/2004 | Jones, Jr. |
| 2004/0258243 A1 | 12/2004 | Shin et al. |
| 2005/0005205 A1 | 1/2005 | Shiue et al. |
| 2005/0025048 A1 | 2/2005 | Masuda et al. |
| 2005/0169465 A1 | 8/2005 | Itani |
| 2005/0216669 A1 | 9/2005 | Zhu et al. |
| 2005/0256722 A1 | 11/2005 | Clark |
| 2005/0286778 A1 | 12/2005 | Atsumi |
| 2006/0059213 A1 | 3/2006 | Evoy |
| 2006/0123248 A1 | 6/2006 | Porter et al. |
| 2006/0222178 A1 | 10/2006 | Kuwabara et al. |
| 2006/0239636 A1 | 10/2006 | Sugiyama et al. |
| 2007/0192861 A1 | 8/2007 | Varghese et al. |
| 2008/0037723 A1 | 2/2008 | Milstein et al. |
| 2008/0046757 A1 | 2/2008 | Staddon et al. |
| 2008/0084975 A1 | 4/2008 | Schwartz |
| 2008/0101338 A1 | 5/2008 | Reynolds et al. |
| 2008/0130883 A1 | 6/2008 | Agaian et al. |
| 2008/0170627 A1 | 7/2008 | Yamada et al. |
| 2008/0219575 A1 | 9/2008 | Wittenstein |
| 2009/0063856 A1 | 3/2009 | Dunn et al. |
| 2009/0067629 A1 | 3/2009 | Kraszewski |
| 2009/0077359 A1 | 3/2009 | Chakravarthula et al. |
| 2009/0168892 A1 | 7/2009 | McFarland et al. |
| 2009/0169001 A1 | 7/2009 | Tighe et al. |
| 2009/0316895 A1 | 12/2009 | Platt et al. |
| 2009/0327751 A1 | 12/2009 | Koifman et al. |
| 2010/0235171 A1 | 9/2010 | Takagi et al. |

OTHER PUBLICATIONS

USPTO, Office Action for U.S. Appl. No. 11/966,247 in the name of James Rodgers Tighe; 30 pages, Feb. 4, 2011.

USPTO Office Action for U.S. Appl. No. 11/848,650, filed Aug. 31, 2007, Dunn, et al., OA dated Sep. 13, 2010, 13 pages.

USPTO, Office Action for U.S. Appl. No. 11/848,650 in the name of Chris A. Dunn; 22 pages, May 11, 2011.

Response to Office Action for U.S. Appl. No. 11/848,650 in the name of Chris A. Dunn; 12 pages, Aug. 11, 2011.

Peterson, "Session Initiation Protocol (SIP) Authenticated Identity Body (AIB) Format," Network Working Group, pp. 1-13, Sep. 2004.

Peterson et al., "Enhancements for Authenticated Identity Management in the Session Initiation Protocol (SIP)," Network Working Group, pp. 1-41, Aug. 2006.

USPTO, Office Action for U.S. Appl. No. 11/848,650 in the name of Chris A. Dunn, 21 pages, Sep. 2, 2011.

USPTO, Office Action for U.S. Appl. No. 11/966,156 in the name of Rowan L. McFarland, et al., 19 pages, Jul. 18, 2011.

Response to Office Action for U.S. Appl. No. 11/966,156 in the name of Rowan L. McFarland, et al., 10 pages, Oct. 18, 2011.

USPTO, Office Action for U.S. Appl. No. 11/966,247 in the name of James R. Tighe, et al., 30 pages, Jul. 7, 2011.

US 8,533,462 B2

VERIFYING CRYPTOGRAPHIC IDENTITY DURING MEDIA SESSION INITIALIZATION

RELATED APPLICATIONS

This application is a continuation of U.S. application Ser. No. 11/770,226 filed Jun. 28, 2007 now U.S. Pat. No. 8,200,959 issued Jun. 12, 2012.

TECHNICAL FIELD

The present disclosure relates generally to verifying cryptographic identity during media session initialization.

BACKGROUND

For largely technical reasons, Session Initiation Protocol (SIP) has been evolving from signaling directly between user agents to signaling through proxies. Session Border Controllers (SBCs) may be utilized on network borders to police the media traffic that enters a network and, through its normal operation, may obscure information regarding endpoints. In operation, an SBC may modify the one or more fields of a message transmitted through the SBC. For example, an SBC may modify a message's Internet Protocol (IP) addresses or ports.

BRIEF DESCRIPTION OF THE DRAWINGS

For a more complete understanding of the present invention and its advantages, reference is made to the following description taken in conjunction with the accompanying drawings in which.

DESCRIPTION OF EXAMPLE EMBODIMENTS

Overview

According to a particular embodiment, a method of verifying cryptographic identity comprises receiving a media initialization message requesting a media session for the exchange of real-time media with a remote endpoint. The media initialization message asserts an identity and includes a plurality of fields and a signature. The signature is formed by encrypting a portion of the fields with a first private key. The plurality of fields includes at least one unsigned field that is not in the portion of the fields, and that unsigned field indicates a source address of the remote endpoint. The method further comprises verifying the signature using a first public key corresponding to the first private key. The first public key is associated with a trusted source, and the verification of the signature confirms that the identity was authenticated by the trusted source. The method further comprises receiving a certificate including a second public key, verifying that the certificate is consistent with data in the media initialization message, confirming the identity of the remote endpoint by receiving confirmation that the remote endpoint knows a second private key corresponding to the second public key, and, in response to confirming the identity, exchanging the media with the remote endpoint.

Description

Figure 1:
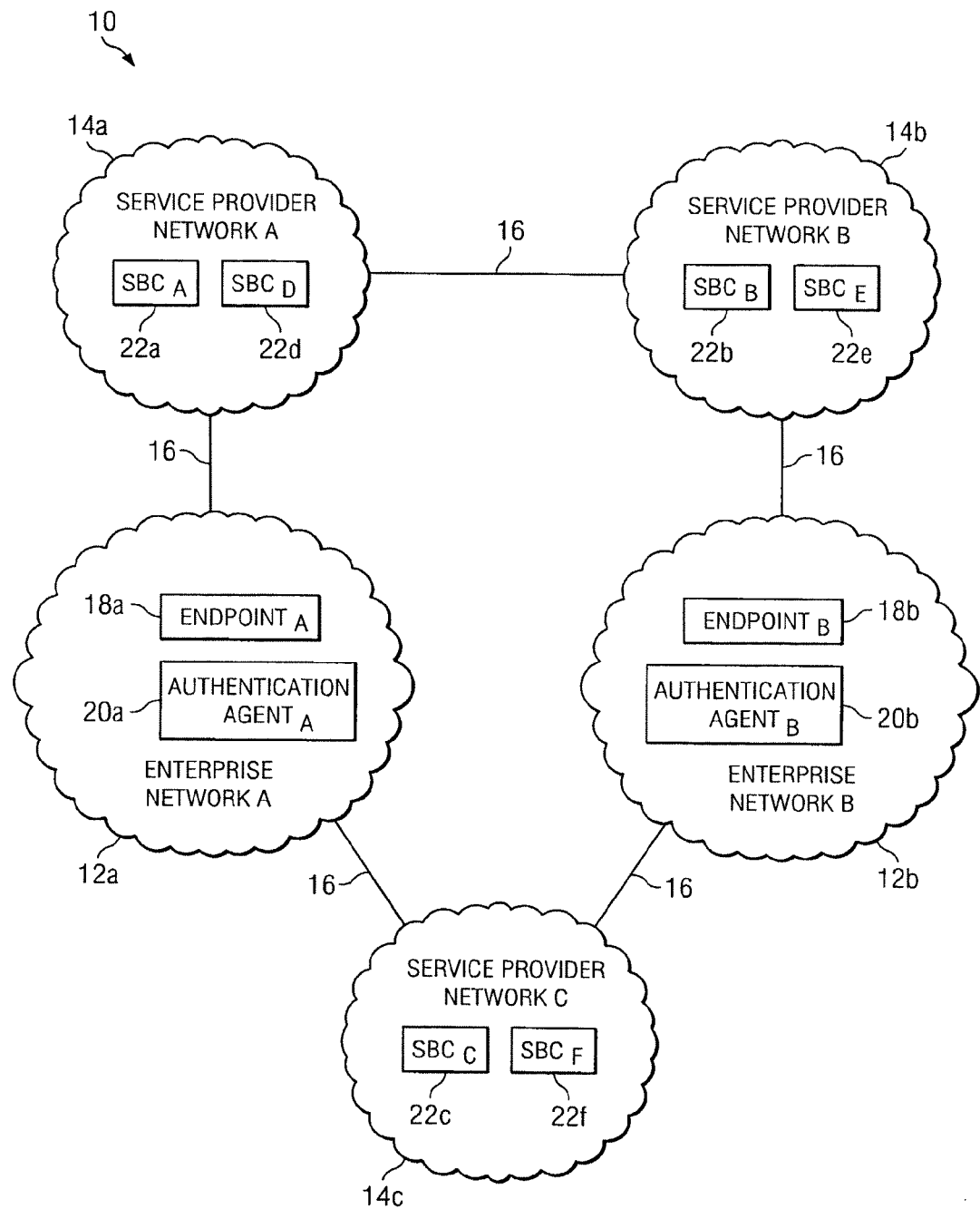
FIG. 1 illustrates a system for verifying cryptographic identity during media session initialization.

FIG. 1 illustrates a system, indicated generally at 10, for verifying cryptographic identity during media session initialization. As illustrated, system 10 includes enterprise networks 12, service provider networks 14, and links 16 connecting the different networks 12, 14. In general, elements within system 10 interoperate to allow the originating endpoint of a media initialization message to be cryptographically identified even though one or more fields of the message may be modified before reaching a destination endpoint. In particular embodiments, an authentication agent for the originating endpoint creates a signature over particular fields of a media initialization message and inserts this signature into the message. A remote authentication agent may receive this message and verify the signature. Finally, the originating endpoint may be authenticated when the endpoints perform a cryptographic operation. After authenticating the originating endpoint, the media session may begin and the endpoints may exchange encrypted and/or unencrypted media.

In the illustrated embodiment, system 10 includes two enterprise networks 12a, 12b. In general, each enterprise network 12a, 12b interconnects the elements within that enterprise network 12a, 12b. In particular embodiments, enterprise network 12 facilitates the initiation and maintenance of media streams involving elements in that enterprise network 12. Enterprise network 12 includes network elements providing connectivity for a particular organization or group, including some or all network elements owned, controlled, or associated with the organization or group. Enterprise network 12 may represent communication equipment including hardware and any appropriate controlling logic for interconnecting elements coupled to or within enterprise network 12. Enterprise network 12 may include any appropriate types, classifications, or categories of networks and may include any combination of gateways, routers, hubs, switches, access points, base stations, and any other hardware or software implementing suitable protocols and communications. While they may contain any suitable additional devices, each illustrated enterprise network 12 includes an endpoint 18 and an authentication agent 20.

Endpoints 18 represent participants in a media session. A media session may be a telephone call, a video conference call, or any other communication session where media is exchanged between devices. An individual wishing to participate in a media session, such as a telephone call, may employ one of endpoints 18 in order to participate in that call. While not separately illustrated, endpoints 18 may include any suitable communications equipment. In certain embodiments, one or more of endpoints 18 is a standard telephone set. In other embodiments, one or more of endpoints 18 is a personal computer or personal digital assistant (PDA). Each endpoint 18 may include a controller, a network interface, a memory, and/or any other suitable components to facilitate its operation. In certain embodiments, endpoints 18 include certain components similar to those described with respect to authentication agent 20 and illustrated in FIG. 2. In particular embodiments, one or more of endpoints 18 includes telepresence equipment, which may include, for example, high-end loud speakers, microphones, speaker phones, displays, cameras, and network interfaces. In general, endpoints 18 may include any suitable components and devices to participate in a call using any suitable protocol techniques or methods. For example, Session Initiation Protocol (SIP) or H.323 may be used. Additionally, endpoints 18 may support and be interoperable with any other appropriate standards or protocols. As illustrated, system 10 includes two endpoints 18a, 18b, one in each enterprise network 12a, 12b; however, it is understood that system 10 may include any suitable number of endpoints 18 in any suitable locations and configurations.

In general, authentication agents 20 authenticate the identities asserted by endpoints 18. Authentication agent 20 may verify that an endpoint 18 in the same enterprise network 12 is authorized to assert a particular identity and may sign media initialization messages sent from that endpoint 18. Authentication agent 20 may also verify an incoming media initialization message's signature.

For example, authentication agent 20a may verify that endpoint 18a is authorized to assert an identity or identities and may sign media initialization messages sent from that endpoint 18 that assert an authorized identity. Authentication agent 20a may sign these messages with a private key corresponding to enterprise network 12a. This signature may verify that enterprise network 12a asserts that this media initialization message, in fact, came from a user having that identity. For example, endpoint 18a may generate a media initialization message asserting that it is Bart Simpson at Cisco. Authentication agent 20a may use any suitable methods to determine whether or not endpoint 18a is authorized to assert that it is Bart Simpson at Cisco. In order to determine whether endpoint 18a is authorized to assert a particular identity, authentication agent 20a may maintain a list of endpoints 18 in enterprise network 12a and the corresponding identity or identities that may be asserted by each of those endpoints 18. Alternatively or in addition, endpoint 18a may provide information to authentication agent 20a or another device in enterprise network 12a to prove that it is authorized to assert a particular identity, potentially for a particular requested media session. For example, a user of endpoint 18a may insert a user name and password, swipe a card, insert an identification tag into a device or field of a reader, etc. If endpoint 18a is authorized assert that it is Bart Simpson at Cisco, then authentication agent 20a may sign the media initialization message and send the message to its destination endpoint 18. However, if endpoint 18a is not authorized to assert that he is Bart Simpson, then authentication agent 20a may drop the message and send an error message to endpoint 18a. Authentication agent 20a may react to improperly asserted identities in any suitable manner.

Authentication agents 20 may also verify the authenticity and accuracy of an incoming media initialization message's signature. For example, authentication agent 20b may receive a media initialization message sent from an originating endpoint 18a to a destination endpoint 18b. Authentication agent 20b may process the message's signature to ensure that a remote enterprise network 12a signed the message. By signing the message, remote enterprise network 12a asserts that the identity in the message is correct. In one example, authentication agent 20b may decrypt the signature with a public key corresponding to the remote enterprise network 12a and compare the decrypted signature to one or more signed fields in order to verify that no signed fields have been altered by intermediate agents. In particular embodiments, authentication agent 20b verifies the message's signature before the media initialization message is communicated to the recipient endpoint 18b.

If the recipient endpoint 18b wishes to participate in the media session, recipient endpoint 18b may challenge the identity of the originating endpoint 18a. The identity of the originating endpoint 18a may be challenged by running encrypted media at endpoints using TLS or DTLS protocols or with an encryption challenge. For example, recipient endpoint 18b may receive the certificate of the originating endpoint 18a. This certificate may indicate a public key associated with the originating endpoint 18a. In certain embodiments, recipient endpoint 18b receives the public key of the originating endpoint 18a. Accordingly, as the term is used herein, a "certificate" may be any message that communicates a public key. In particular embodiments, recipient endpoint 18b checks the certificate against a field in the media initialization message that contains a cryptographic hash of the certificate. Recipient endpoint 18b may challenge the identity of the originating endpoint 18a by requesting that the originating endpoint 18a sign or encrypt particular data (e.g., a text string) with its private key. After receiving the signed or encrypted data, recipient endpoint 18b may verify that the originating endpoint 18a knows the private key corresponding to the public key contained in the verified certificate. Rather than using TLS or DTLS, ICE, HIP, or any other suitable protocols may be used or adapted to challenge the identity of the originating endpoint 18a. After the identity of the originating endpoint 18a has been challenged and confirmed, then the participating endpoints 18 may continue the media session by exchanging encrypted and/or unencrypted media. As described, the recipient endpoint 18 is responsible for challenging the identity of the originating endpoint 18; however, authentication agent 20 also may perform or assist in the performance of an identity challenge.

While each enterprise network 12a, 12b is illustrated as containing one authentication agent 20a, 20b, it is to be understood that any enterprise network 12 may contain any suitable number of authentication agents 20 in any suitable locations and configuration. Additionally, authentication agents 20 are logically described and their functionality may be distributed throughout any number of elements in a particular enterprise network 12. For example, authentication agent 20a and authentication agent 20b may have substantially similar functionality as described above with respect to the other. Moreover, endpoints 18 may perform all, some, or none of the operations described as being performed by authentication agents 20 and vice versa. Additionally, while illustrated in a corresponding enterprise network 12, authentication agent 20 may be located at any suitable place in system 10.

As illustrated, system 10 also includes three service provider networks 14a, 14b, 14c. In general, each service provider network provides communication services for one or more enterprise networks 12. Service provider network 14 may route communications on behalf of enterprise network 12 so that communications sent from enterprise network 12 to other elements in system 10 appear to be sent and received from a single device. Enterprise networks 12 may route communications through one or more service provider networks 14 in order to avoid various difficulties and complications encountered in routing, maintaining, and terminating media sessions. Service provider network 14 may include communication equipment such as hardware and any appropriate controlling logic for interconnecting elements coupled to or within service provider network 14. Service provider network 14 may include a local area network (LAN), metropolitan area network (MAP), wide area network (WAN), any other public or private network, a local, a regional, or global communication network, and enterprise internet, or other suitable wireline or wireless communication link, or any combination of any suitable networks. Service provider network 14 may include any combination of gateways, routers, hubs, switches, access points, base stations and other hardware or software implementing suitable protocols and communications.

Links 16 illustrate connections between different networks 12, 14. In general, links 16 may connect any suitable devices and/or networks. While a limited number of links 16 are illustrated, system 10 may include any number of logical links 16 between different networks 12, 14. In the illustrated embodiment, enterprise network 12a connects through link 16 to service provider network 14a and connects through another link 16 to service provider network 14c. Likewise, enterprise network 12b connects through link 16 to service provider network 14b and connects through another link 16 to service provider network 14c. As illustrated, service provider network 14a is also connected through a link 16 to service provider network 14b. Accordingly, a message sent from enterprise network 12a to enterprise network 12b can travel either: (1) through service provider network 14a to service provider network 14b to reach enterprise network 12b, or (2) through service provider network 14c to reach enterprise network 12b. Likewise, a message sent from enterprise network 12b to enterprise network 12a has two corresponding reverse paths. Enterprise networks 12 or devices operating on behalf of those networks 12 may choose which links to use based on contracts or any another suitable factors. While system 10 is illustrated as having this particular configuration, it is to be understood that system 10 may include any suitable number of enterprise networks 12, service provider networks 14, and links 16 arranged in any suitable configuration.

As illustrated, each service provider network 14 includes two session boarder controllers (SBCs) 22. SBCs 22 are application layer gateways that assist in routing messages, maintaining media sessions, and coordinating the operation of various aspects of a corresponding service provider network 14. For example, SBC 22 may police what traffic is allowed to enter service provider network 14 in order to ensure that traffic entering service provider network 14 should enter service provider network 14. SBCs 22 may also remove information from a message that is exiting service provider network 14. For example, SBCs 22 may remove information such as via headers so that the inner workings of its associated service provider network 14 remain confidential. In particular embodiments SBCs 22 maintain any necessary routing information. For example, SBCs 22 may store routing information regarding the inner-workings of a particular service provider network 14. In certain embodiments, SBCs 22 assist in routing messages through service provider network 14 so that those messages reach their intended destination. While each service provider network 14 is illustrated with two SBCs 22, one corresponding to each external link 16, it is to be understood that each service provider network 14 may include any suitable number of SBCs 22 in any suitable location and configuration in that service provider network 14. In particular embodiments, the functions of these two SBCs 22 are performed by one physical and/or one logical SBC 22.

In an example operation, endpoint 18a generates a media initialization message and sends the message to authentication agent 20a. In particular embodiments, the media initialization message is an SIP message containing session description protocol (SDP) fields. Authentication agent 20a may analyze the message and verify that endpoint 18a is authorized to assert the identity asserted in the SIP message. Authentication agent 20a may then sign a portion of the media initialization message before sending it through service provider network(s) 14. SBCs 22 that route the SIP message may alter various SDP fields, including, for example, IP addresses and ports. A signature using known methods may be created over these fields, but, if SBCs 22 alter the SDP body, that signature would be invalidated by those alterations before the media initialization message reaches the destination endpoint 18b. Authentication agent 20a may generate a new Media-Fingerprint field containing all, some, or none of the information in one or more SDP fields. In particular embodiments, the Media-Fingerprint field may aggregate all the fingerprint fields associated with each media line specified in the SDP body. In other embodiments, the Media-Fingerprint field contains any suitable information regarding the requested media session. Authentication agent 20a may then sign the Media-Fingerprint field and all, some, or none of the SIP fields in order to generate a signature for the media initialization message. For example, in addition to the Media-Fingerprint field, authentication agent 20a may sign the Contact, Date, Call-ID, CSeq, To, and From fields of the SIP message. Authentication agent 20a may sign the fields of the media initialization message with a private key for enterprise network 12a. In particular embodiments, the public key corresponding to this private key is publicly available. In certain embodiments, enterprise network 12 may have one or more public/private key combinations that may be updated or changed over time. This signature may verify that enterprise network 20a has authorized originating endpoint 18a to assert the identity specified in the media initialization message. The message's signature may be incorporated into other message fields, provided as its own field, and/or sent to the destination endpoint 18b separately.

Authentication agent 20a may then send the signed media initialization message to the destination endpoint 18b via one or more service provider networks 14. For example, authentication agent 20a may then send media initialization message to service provider network 14c. SBC 22c may receive the media initialization message and may modify one or more fields of the media initialization message. For example, SBC 22c may modify one or more headers, IP addresses, and/or ports. The media initialization message is then routed through service provider network 14c to SBC 22f. SBC 22f may also modify one or more fields of the media initialization message. In particular embodiments, SBC 22f strips via headers from the media initialization message before sending the media initialization message to enterprise network 12b. SBC 22f may strip via headers in order to obscure the internal routings and device identities within service provider network 14c.

Authentication agent 20b receives the media initialization message and verifies the signature contained in the media initialization message. For example, authentication agent 20b may verify that enterprise network 12a generated the signature over one or more particular fields of the message. In particular embodiments, authentication agent 20b uses the enterprise network's 12a public key in order to verify that the signature was created using the private key and that the signed fields have not since been altered. While signature verification is described in this particular manner, authentication agents 20 may use any suitable encryption and signature techniques to provide assurance that the signed fields of a message were not altered after the signing device signed the message. Once authentication agent 20b verifies the signature contained in the message, authentication agent 20b may forward the message to endpoint 18b. If endpoint 18b wishes to participate in the media session, endpoints 18 may exchange certificates. Each certificate may contain, among other information, a public key corresponding to that endpoint 18. In particular embodiments, each endpoint 18 has an associated public/private key pair. Endpoints 18 may have more than one public/private key pair and these keys may change over time. Recipient endpoint 18b may check to ensure that the certificate for the originating endpoint 18a matches information provided in the media initialization message. Likewise, originating endpoint 18a may verify the certificate provided by recipient endpoint 18b. For example, the media initialization message may specify a cryptographic hash of a certificate for the originating endpoint 18a.

Recipient endpoint 18b may then initiate a procedure to challenge and confirm the identity of the originating endpoint 18a. In particular embodiments, recipient endpoint 18b may use TLS, DTLS, ICE, HIP, or any other suitable techniques to challenge and confirm the identity of the originating endpoint 18a while exchanging encrypted media. For example, recipient endpoint 18b may send a message to endpoint 18a requesting that endpoint 18a sign or encrypt data with its private key. For example, recipient endpoint 18b may request that endpoint 18a sign or encrypt a string of text, e.g., "The quick brown fox jumped over the lazy dog." Endpoint 18a, after receiving such a message, may sign or encrypt this text with its private key and send the encrypted text to recipient endpoint 18b. Recipient endpoint 18b, using the public key obtained through the media initialization message, may verify that endpoint 18a knows the private key corresponding to the public key indicated by the media initialization message. Once the identity of the originating endpoint 18a is confirmed, endpoint 18a and endpoint 18b may begin the media session using either encrypted or unencrypted transmissions. While particular devices have been described as performing these techniques, endpoints 18 and/or authentication agents 20 may perform all, some, or none of the steps described.

Particular embodiments of a system for verifying cryptographic identity during media session initialization have been described and are not intended to be all inclusive. While system 10 is depicted as containing a certain configuration and arrangement of elements, it should be noted that this is a logical depiction, and the components and functionality of system 10 may be combined, separated and distributed as appropriate both logically and physically. Also, the functionality of system 10 may be provided by any suitable collection and arrangement of components. The functions performed by authentication agents 20 and endpoints 18 may be accomplished by any suitable devices to provide and verify cryptographic identity.

Figure 2:
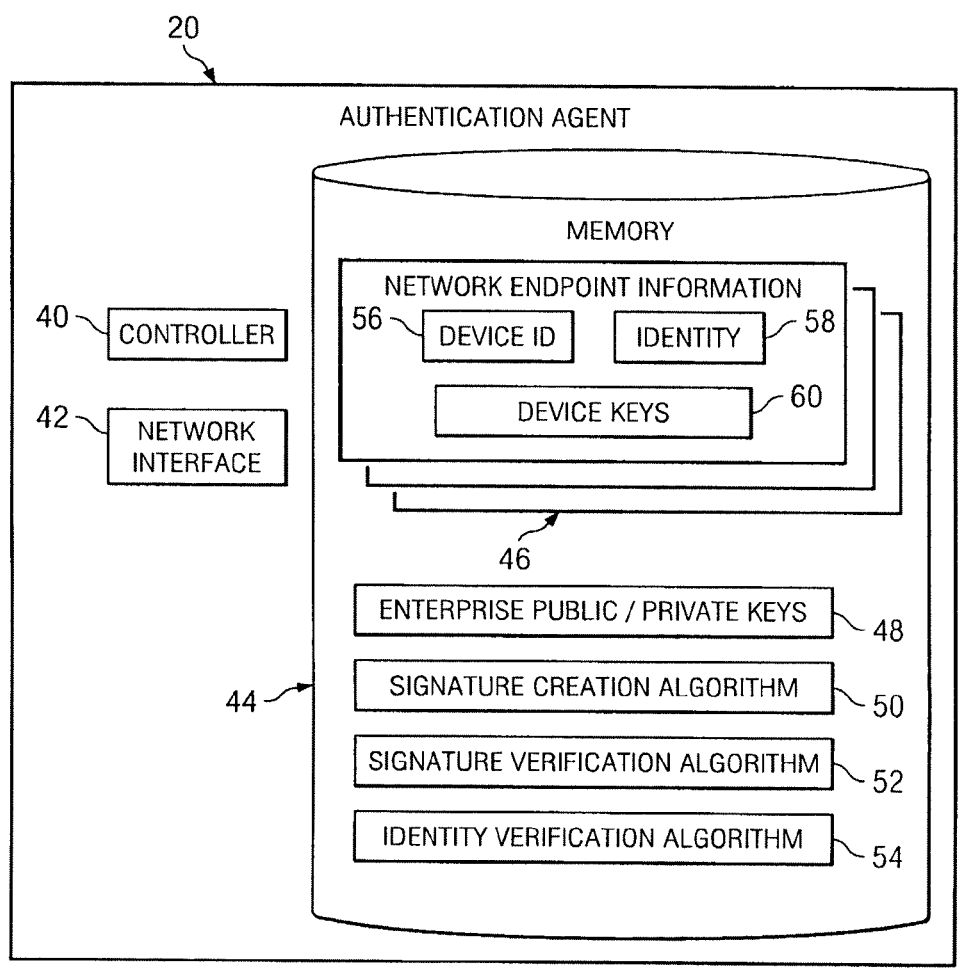
FIG. 2 illustrates an authentication agent operable to authenticate and verify the cryptographic identity of endpoints.

FIG. 2 illustrates an authentication agent, indicated generally at 20, operable to authenticate and verify the cryptographic identity of endpoints 18. In the illustrated embodiment, authentication agent 20 includes a controller 40, a network interface 42, and a memory 44.

In general, controller 40 controls the operations and functions of authentication agent 20. Controller 40 may process messages and information received by authentication agent 20 through network interface 42. Controller 40 may also access and store information in memory 44 for use during operation. While depicted as a single element in authentication agent 20, it is understood that the functions of controller 40 may be performed by one or many elements. Controller 40 may be comprised of any suitable components, hardware, software, and/or logic and may have any suitable additional functionality to control the operation of authentication agent 20. The term "logic," as used herein, encompasses software, firmware, and other computer readable code that may be executed to perform operations.

Network interface 42 supports communications with other elements of system 10. For example, network interface 42 may receive messages from and send messages to devices in enterprise network 12, such as endpoint 18a. In particular embodiments, network interface 42 may also interface enterprise network 12 with service provider networks 14 and/or other networks and/or devices in system 10. In particular embodiments, network interface 42 may comprise a wired ethernet interface. While described and illustrated as a single component within authentication agent 20, it is understood that this is a logical depiction. Network interface 42 may be comprised of any suitable components, hardware, software, and/or logic for interfacing authentication agent 20 with other elements in enterprise network 12 and/or system 10.

Memory 44 stores data and algorithms used by authentication agent 20. As illustrated, memory 44 includes network endpoint information 46, enterprise public/private keys 48, signature creation algorithm 50, signature verification algorithm 52, and identity verification algorithms 54. While memory 44 is illustrated as maintaining specific information, system 10 contemplates memory 44 storing any suitable information to facilitate the operations of authentication agent 20.

Network endpoint information 46 maintains information regarding endpoints located within the same enterprise network 12 as authentication agent 20. As illustrated, network endpoint information 46 includes device identification 56, identity 58, and public/private keys 60. Device identification 56 may maintain information sufficient to uniquely identify a particular endpoint 18. For example, device identification 56 may include a MAC address corresponding to that particular endpoint 18. Identity 58 may store information regarding the identity or identities that may be asserted by a particular endpoint 18. For example, identity 58 may specify the user name that has been associated with endpoint 18. In particular embodiments, the information in identity 58 may be modified, updated, and removed as appropriate. Device keys 60 may store any suitable number and type of public keys, private keys, certificates, and/or certificate fingerprints corresponding to a particular endpoint 18. Device keys 60 may be obtained from the corresponding endpoint 18 or may be generated on behalf of that endpoint 18. For example, device keys 60 may store a certificate for a particular endpoint 18. As another example, device keys 60 may store a public and private key pair having a relationship specified by the RSA public/private key encryption protocols. In other embodiments, device keys 60 stores any suitable data that may be used to verify or authenticate the sender of a message, and, in these cases, the "keys" used to sign messages may include this data. Alternatively, network endpoint information 46 may not include device keys 60. In general, network endpoint information 46 may store information for each authorized endpoint 18 in enterprise network 12. For example, in the embodiment illustrated in FIG. 1, network endpoint information 46 in authentication agent 20a may store information regarding endpoint 18a. While illustrated as having particular components, it is to be understood that network endpoint information 46 may include any suitable information to allow authentication agent 20 to verify that one of endpoints 18 in a corresponding enterprise network 18 is authorized to assert the identity included in a message sent by that endpoint 18, e.g., a media initialization message.

Enterprise public/private keys 48 may store one or more public/private key pairs for enterprise network 12. For example, a public key and private key pair stored in enterprise public/private keys 48 may have a relationship specified by the RSA public/private key encryption protocols. In other embodiments, enterprise public/private keys 48 stores any suitable data that may be used to verify or authenticate that a message was signed by enterprise network 12. The "keys" used to sign messages leaving an enterprise network 12 may include any data or algorithms used by devices to prove that a message was sent from or authorized by a particular device and/or network.

Signature creation algorithm 50 stores a method of creating signatures. Authentication agent 20 may use enterprise public/private keys 48 and signature creation algorithm 50 and to sign outbound media initialization messages. For example, signature creation algorithm 50 may encrypt one or more fields of a message with a private key stored in enterprise public/private keys 48. This may then be inserted into the outbound media initialization message as a signature. Authentication agent 20 may also use signature creation algorithm 50 to sign data with an endpoint's device key 60 in order to confirm the identity of one of endpoints 18, e.g., while exchanging encrypted communications, such as when an identity challenge is posed by a remote authentication agent 20 and/or remote endpoint 18.

Authentication agent 20 uses signature verification algorithm 52 to verify a signature contained in a received message. For example, authentication agent 20*a* may receive a media initialization message directed to a destination endpoint 18*a* located in the corresponding enterprise network 12*a*. Authentication agent 20*a*, using signature verification algorithm 52, may verify that the signed fields in the media initialization message have not been altered since the signature was created. In particular embodiments, signature verification algorithm 52 may process the signature using a public key corresponding to the device or network that signed the message. For example, a media initialization message received from an originating endpoint 18*b* in remote enterprise network 12*b* may have been allegedly signed by a remote authentication agent 20*b* with a private key corresponding to the remote enterprise network 12*b*. Using signature verification algorithm 52, authentication agent 20*a* may determine a public key corresponding to that remote enterprise network 12*b* and, using that public key, may verify that the signature was generated using the private key and that the signed fields have not since been altered. Authentication agent 20 may have any suitable number of signature verification algorithms 52 corresponding to different signature algorithms that may be employed in system 10.

In particular embodiments, authentication agent 20 performs or assists in the performance of an identity challenge. Identity verification algorithms 54 store methods and/or protocols for challenging and confirming the identity of an originating endpoint 18. For example, the identity of an originating endpoint 18 may be challenged in order to verify that an attacker has not stolen a media initialization message from the originating endpoint 18 and later modified and used that media initialization message in an attack. In particular embodiments, the identity of an originating endpoint 18 is challenged while running encrypted media at the participating endpoints 18 using TLS or DTLS protocols. In certain embodiments, identity verification algorithms 54 also store methods using ICE and/or HIP protocols. In other embodiments, any suitable identity verification algorithm 54 may be used and stored.

In an example operation, authentication agent 20*a* receives a media initialization message from one of endpoints 18*a* in the corresponding enterprise network 12*a*. Authentication agent 20*a* may access network endpoint information 46 to determine whether that endpoint 18*a* is authorized to assert the identity asserted in the media initialization message. For example, authentication agent 20*a* may use device identification 56 to uniquely identify endpoint 18*a* and may access the corresponding identities 58 to determine if endpoint 18*a* is authorized to send a media initialization message asserting a particular identity. If so, then authentication agent 20 may sign the media initialization message with the enterprise private key 48 using signature creation algorithm 50. Authentication agent 20*a* may then send the media initialization message to destination endpoint 18 through one or more service provider networks 14 and their corresponding SBCs 22.

In another example operation, authentication agent 20*a* receives a signed media initialization message sent by a remote endpoint 18*b* and destined for an endpoint 18*a* in a corresponding enterprise network 12*a*. Authentication agent 20*a* may analyze the signature to verify that the message was signed by enterprise network 12*b*. This signature may indicate that enterprise network 12*b* confirms that the message properly asserts the originator's identity. After verifying the signature, authentication agent 20*a* may forward the media initialization message to the destination endpoint 18*a*. If the destination endpoint 18*b* indicates that it would like to participate in the media session, then the participating endpoints 18*a*, 18*b* may exchange certificates. In particular embodiments, while running encrypted media at endpoints 18*a*, 18*b*, authentication agent 20*b* challenges the identity of the originating endpoint 18*a*. This may be done, for example, to confirm that the original media initialization message was not stolen and reused by a third party. Authentication agent 20*a* may use one or more identity verification algorithms 54 to accomplish this identity challenge. In particular embodiments, authentication agent 10*a* may request confirmation that the originating endpoint 18*b* knows a private key corresponding to the public key asserted by that endpoint's 18*b* certificate. In other embodiments, recipient endpoint 18*b* participates in the identity challenge of originating endpoint 18*a*. Accordingly, endpoints 18 may have similar components and functionality as is described with respect to authentication agent 20. After this identity challenge is completed, the endpoints 18 may begin transmission of encrypted and/or unencrypted media.

Particular embodiments of an authentication agent have been described and are not intended to be all inclusive. While authentication agent 20 is depicted as containing a certain configuration and arrangement of elements, it should be noted that this is a logical depiction, and the components and functionality of authentication agent 20 may be combined, separated and distributed as appropriate both logically and physically. Also, the functionality of authentication agent 20 may be provided by any suitable collection and arrangement of components to provide and verify cryptographic identity. For example, the functions performed by authentication agents 20 may be accomplished, in part or in whole, by endpoints 18.

Figure 3:
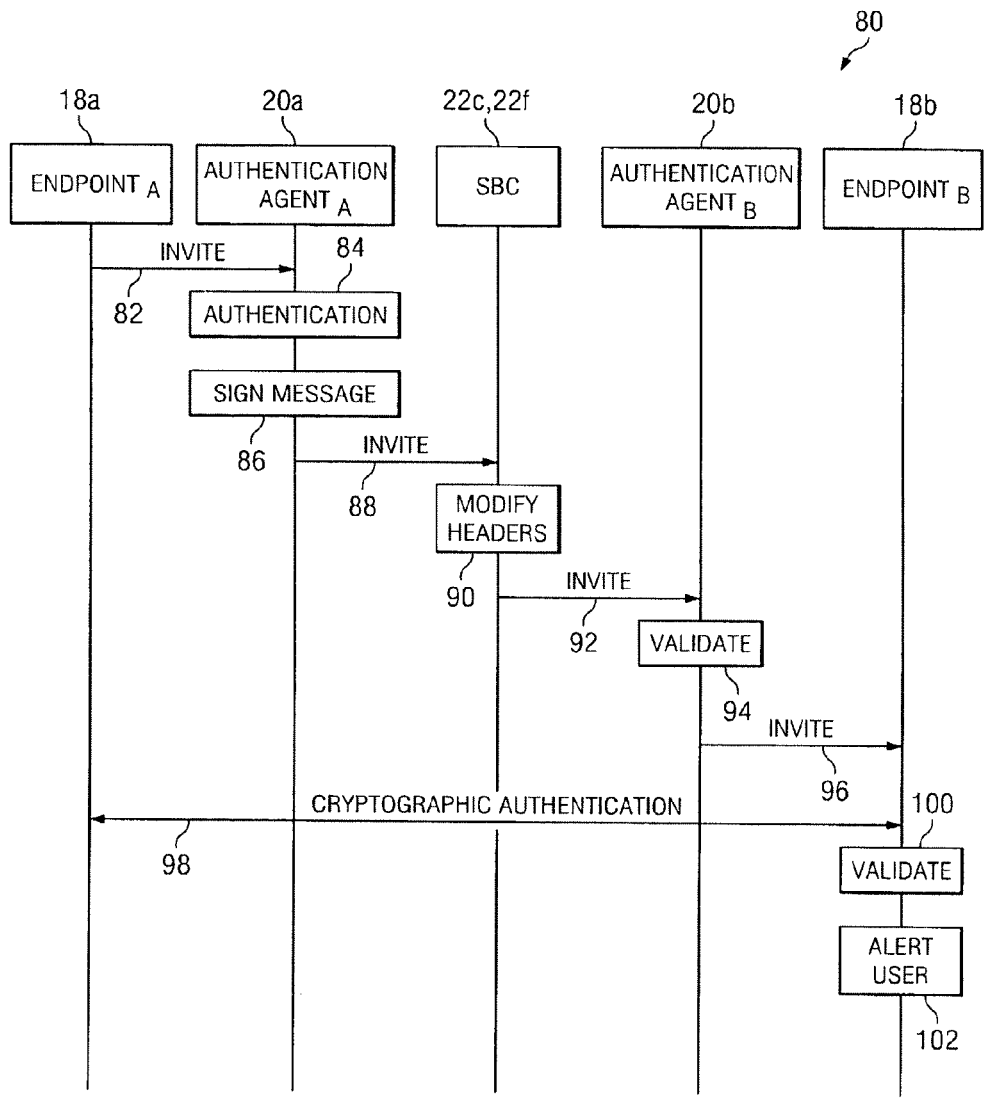
FIG. 3 is a signal diagram illustrating messages exchanged for cryptographic identity verification during media session initialization.

FIG. 3 is a signal diagram, indicated generally at 80 illustrating messages exchanged for cryptographic identity verification during media session initialization. As illustrated, messages are exchanged between endpoint 18*a*, authentication agent 20*a*, SBCs 22*c*, 22*f*, authentication agent 20*b*, and endpoint 18*b*.

At step 82, a media initialization message is sent from endpoint 18*a* to authentication agent 20*a*. In particular embodiments, the media initialization message is an SIP invite message including an SDP body. At step 84, authentication agent 20*a* checks that endpoint 18*a* is authorized to assert the identity contained in the media initialization message. Authentication agent 20*a* may access a table or database of devices in enterprise network 12*a*, such as network endpoint information 46, to determine the identity or identities that endpoint 18*a* is authorized to assert. Alternatively or in addition, the invite message may contain information that allows authentication agent 20*a* to determine that endpoint 18*a* is authorized to assert a particular identity. At step 86, authentication agent 20a signs the media initialization message. Authentication agent 20a may sign selected fields of the media initialization message with a private key stored in enterprise public/private keys 48 using signature creation algorithm 50. Before signing the media initialization message, authentication agent 20a may insert a Media-Fingerprint field, which includes selected information from the SDP body, into the media initialization message. For example, the Media-Fingerprint may include the fingerprints corresponding to each media line specified by the SDP body. One or more of these fingerprints, or the Media-Fingerprint itself, may include a hashed version of a certificate corresponding to the originating endpoint 18a. In particular embodiments, authentication agent 20a signs various SIP headers, including Contact, Date, Call-ID, CSeq, To, and From, and the Media-Fingerprint field. Authentication agent 20a may not sign the entire SDP body because intermediate devices, such as SBCs 22, may modify one or more fields in the SDP body, which would destroy a signature created over those fields.

At step 88, authentication agent 20a forwards the media initialization message to SBC 22c in service provider network 14c. SBC 22c may route the media initialization message through various devices in service provider network 14c before it arrives at SBC 22f, which may then forward the media initialization message to enterprise network 14b. At step 90, these intermediate devices (i.e., SBC 22c and/or SBC 22f) modify one or more headers in the media initialization message. For example, SBCs 22c, 22f may modify IP addresses, ports, and/or via headers of the invite message so as to obscure the particular configuration of or routing used by service provider network 14c. At step 92, SBC 22f forwards the media initialization message to authentication agent 20b. At step 94, authentication agent 20b verifies the media initialization message's signature to make sure that the media initialization message was authorized by enterprise network 12a. In particular embodiments, authentication agent 20b encrypts the signature with a public key corresponding to authentication agent 20a and compares the signature to the signed fields. Once the invite message is validated, authentication agent 20b forwards the invite message to endpoint 18b in step 96.

After endpoint 18b accepts the media initialization message, endpoints 18b, 18a begin cryptographic authentication in step 98. Endpoint 18b may employ cryptographic authentication in order to verify that the invite message was not fraudulently altered and resent by a third party. Endpoint 18b may use cryptographic authentication to verify that the media session will, in fact, be initiated with the originating endpoint 18a. In particular embodiments, this cryptographic authentication is accomplished while running encrypted media at endpoints 18 according to TLS or DTLS protocols. Endpoints 18a, 18b may exchange certificates, each of which may have a public key corresponding to the particular endpoint 18a, 18b. Endpoint 18b may verify that the received certificate corresponds to a hash of the certificate found in the media initialization message received from endpoint 18a. Endpoint 18b may use the certificate to challenge the identity of the originating endpoint 18a. In particular embodiments, endpoint 18b challenges the identity of the originating endpoint 18a by requiring the originating endpoint 18a to prove that it knows the private key corresponding to the certificate's public key. For example, endpoint 18b may request that endpoint 18a encrypt a particular set of data, e.g., a string of text, with its private key. Endpoint 18a upon receiving this message encrypts the data with its private key and sends the encrypted data to endpoint 18b. Endpoint 18b uses the public key to verify that endpoint 18a, in fact, knows the corresponding private key. In certain embodiments, ICE protocols may instead be used to cryptographically authenticate endpoints 18. Alternatively, HIP protocols may be used to cryptographically authenticate endpoints 18. In particular embodiments, the cryptographic authentication of step 98 may be performed while the participating endpoints 18 exchange media streams pursuant to a media session. After receiving one or more messages, endpoint 18b confirms the identity of endpoint 18a at step 100 and, at step 102, informs the user of the results of this determination. In particular embodiments, endpoint 18b may alert the user that the identity was confirmed by simply initiating or continuing the media session.

Particular embodiments of a system exchanging messages for cryptographic identity verification and media session initialization have been described and are not intended to be all inclusive. While signal diagram 80 is depicted as containing a particular combination of elements communicating specific messages, it should be noted that this is merely an abstracted example. The specific messages transmitted as well as the elements transmitting those messages may be combined, separated, distributed, modified, and deleted as appropriate. For example, while endpoint 18 and authentication agent 20 are described as separate and distinct devices, it is to be understood that the functionality of these devices may be combined and distributed in any suitable manner. For example, rather than including a separate authentication agent 20 in enterprise network 12, one or more endpoints 18 may implement substantially similar functions. Also, the functionality described may be provided by any suitable collection and arrangement of components.

Figure 4:
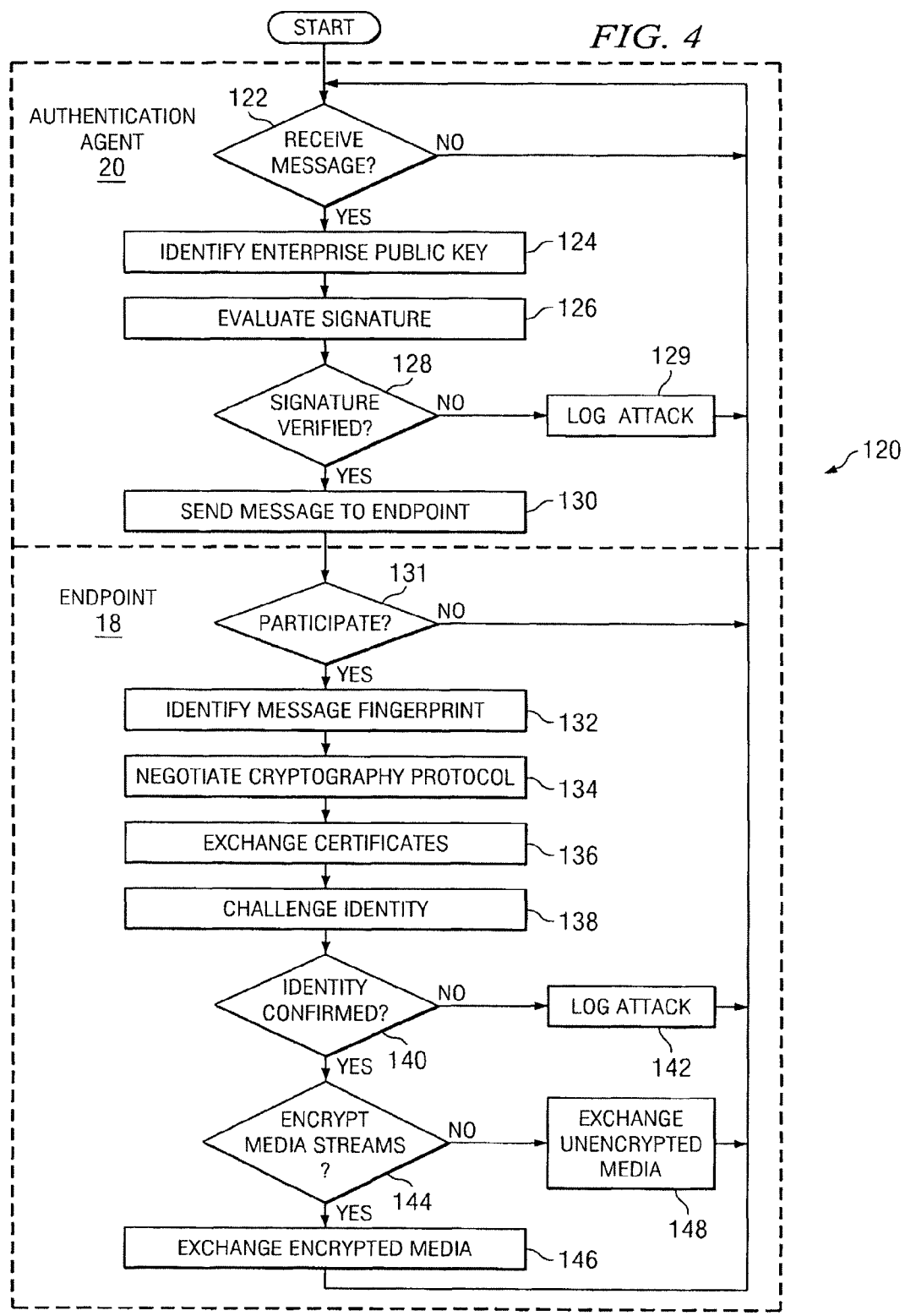
FIG. 4 is a flowchart illustrating a method of verifying cryptographic identity during a media session's initialization.

FIG. 4 is a flowchart illustrating a method, indicated generally at 120, of verifying cryptographic identity during a media session's initialization performed by authentication agent 20 and recipient endpoint 18 corresponding to the same enterprise network 14.

At step 122, authentication agent 20 determines whether a media initialization message has been received. If not, then method 120 returns to step 122. If a media initialization message has been received, authentication agent 20 identifies a public key for the enterprise network 12 that sent the media initialization message, in step 124. In particular embodiments, authentication agent 20 may have stored a list of public keys corresponding to different enterprise networks 12. In other embodiments, authentication agent 20 accesses a service in order to obtain the public key corresponding to the originating enterprise network 12. At step 126, authentication agent 20 checks the signature in the received media initialization message to see if the message's asserted identity was authenticated by the originating enterprise network 12. Authentication agent 20 may use the public key corresponding to the originating enterprise network 12 to verify that the signature was created using the enterprise's private key and that the signed fields have not since been altered. Authentication agent 20 determines whether not the signature is verified in step 128. If the signature is not verified, authentication agent 20 logs a potential attack in step 129, and method 120 returns to step 122.

If the signature is verified, then authentication agent 20 sends the media initialization message to the recipient endpoint 18, in step 130. At step 131, recipient endpoint 18 determines whether or not to participate in the media session. If recipient endpoint 18 decides not to participate, then method 120 returns to step 122; otherwise, method 120 progresses to step 132, where recipient endpoint 18 identifies a fingerprint in the media initialization message. The fingerprint may contain a hash of a certificate corresponding to the originating endpoint 18. This certificate may include a public key specific to the originating endpoint 18. In particular embodiments, the fingerprint is stored in a Media-Fingerprint field. In other embodiments, the fingerprint is stored in a fingerprint attribute associated with the media line in the SDP body. At step 134, recipient endpoint 18 negotiates a cryptography protocol with the originating endpoint 18. Once the cryptography protocol is selected, recipient endpoint 18 exchanges certificates with the originating endpoint 18 in step 136. These certificates may each contain a public key corresponding to the particular endpoint 18 that sent the certificate. Recipient endpoint 18 may check the certificate received from originating endpoint 18 to verify that the media initialization message's fingerprint contains a hash of this certificate.

At step 138, recipient endpoint 18 challenges the identity of the originating endpoint 18. For example, recipient endpoint 18 may challenge the identity of the originating endpoint 18 in order to verify that the originating endpoint 18 knows the private key associated with the public key contained in the certificate sent by the originating endpoint 18. The identity challenge may be accomplished while the participating endpoints 18 are exchanging encrypted media in the media session. In particular embodiments, recipient endpoint 18 may send data, e.g., a string of text, to the originating endpoint requesting that the originating endpoint 18 encrypt the data with its private key. After receiving the encrypted data, recipient endpoint 18 may use the public key in the received certificate to verify that data was properly encrypted with the corresponding private key. At step 140, recipient endpoint 18 determines whether the identity of the originating endpoint 18 has been confirmed by the challenge. If not, method 120 proceeds to step 142 where recipient endpoint 18 logs a potential attack and returns to step 122. In particular embodiments, endpoint 18 logs an attack by sending a suitable message to its authentication agent 20. However, if the identity of the originating endpoint 18 is confirmed, then method 120 continues to step 146. At step 146, recipient endpoint 18 determines whether the media streams should be encrypted. If the media streams should be encrypted, then method 120 proceeds to step 148 where the destination endpoint 18 and the originating endpoint 18 send and receive encrypted media during a media session. Otherwise, method 120 proceeds to step 150 where the originating endpoint 18 and the destination endpoint 18 send and receive unencrypted media. For example, endpoints 18 may wish to exchange unencrypted media in countries where encrypted communications are prohibited.

The method described with respect to FIG. 4 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method comprising:
   receiving, by a device associated with a first network, a media initialization message requesting a media session for the exchange of real-time media with a remote endpoint associated with a second network, the media initialization message asserting an identity and comprising a plurality of fields and a signature, the signature formed by encrypting a portion of the fields with a private key associated with a trusted source other than the remote endpoint, the plurality of fields including at least one unsigned field not in the portion of the fields;
   verifying, by the device associated with the first network, the signature using a public key corresponding to the private key, the public key associated with the trusted source, the verification of the signature confirming that the identity was authenticated by the trusted source;
   sending an encryption request to the remote endpoint, the encryption request specifying data and requesting that the remote endpoint encrypt the data with the private key;
   receiving a response from the remote endpoint;
   decrypting the response with the public key;
   confirming that the decrypted response is equivalent to the data specified by the encryption request; and
   in response to confirming the identity, exchanging the real-time media with the remote endpoint.

2. The method of claim 1, wherein:
   the trusted source is a network; and
   the identity comprises one of the following at the network: a user name, a phone number, or arm identifier.

3. The method of claim 1, wherein the media initialization message is a session initiation protocol (SIP) invite message containing a session description protocol (SDP) body.

4. The method of claim 3, wherein:
   the portion of the fields comprise one or more of the following SIP fields: Contact, Date, Call-ID, CSeq, To, From, the public key associated with the endpoint, and a fingerprint of the public key associated with the endpoint;
   the plurality of fields includes at least one unsigned field not in the portion of the fields, the at least one unsigned field comprising part of the SDP body; and
   a network element modifies the at least one unsigned field after the signature is inserted into the media initialization message.

5. The method of claim 1, further comprising establishing a media session between the remote endpoint and a recipient endpoint through signaling.

6. The method of claim 5, wherein the identity is confirmed using one of the following protocols: TLS, DTLS, ICE, and HIP.

7. The method of claim 1, wherein:
   the device associated with the first network comprises an authentication agent associated with the first network; and
   the steps of sending the encryption request, receiving the response, decrypting the response, and confirming the decrypted response are additionally performed by the authentication agent.

8. The method of claim 1, wherein:
   the device associated with the first network comprises an authentication agent associated with the first network; and
   the steps of sending the encryption request, receiving the response, decrypting the response, and confirming the decrypted response are performed by a recipient endpoint associated with the first network.

9. The method of claim 1, wherein:
   the device associated with the first network comprises a recipient endpoint associated with the first network; and the steps of sending the encryption request, receiving the response, decrypting the response, and confirming the decrypted response are additionally performed by the recipient endpoint.

10. A system comprising:
an authentication agent operable to:
receive a media initialization message requesting a media session for the exchange of real-time media with a remote endpoint, the media initialization message asserting an identity and comprising a plurality of fields and a signature, the signature formed by encrypting a portion of the fields with a private key associated with a trusted source other than the endpoint, the plurality of fields including at least one unsigned field not in the portion of the fields; and
verify the signature using a public key corresponding to the private key, the public key associated with the trusted source, the verification of the signature confirming that the identity was authenticated by the trusted source; and
a recipient endpoint operable to:
sending an encryption request to the remote endpoint, the encryption request specifying data and requesting that the remote endpoint encrypt the data with the private key;
receiving a response from the remote endpoint;
decrypting the response with the public key;
confirming that the decrypted response is equivalent to the data specified by the encryption request; and
in response to confirming the identity, exchanging the real-time media with the remote endpoint.

11. The system of claim 10, wherein:
the trusted source is a network; and
the identity comprises one of the following at the network: a user name, a phone number, or an identifier.

12. The system of claim 10, wherein the media initialization message is a SIP invite message containing a SDP body.

13. The system of claim 12 wherein:
the portion of the fields comprise one or more of the following SIP fields: Contact, Date, Call-ID, CSeq, To, From, a public key associated with the endpoint, and a fingerprint of the public key associated with the endpoint;
the plurality of fields includes at least one unsigned field not in the portion of the fields, the unsigned field comprising the SDP body; and
a network element modifies the unsigned field after the signature is inserted into the media initialization message.

14. The system of claim 10, wherein the identity is confirmed using one of the following protocols: TLS, DTLS, ICE, and HIP.

15. Logic encoded in one or more non-transitory tangible media for execution and when executed operable to:
receive a media initialization message requesting a media session for the exchange of real-time media with a remote endpoint, the media initialization message asserting an identity and comprising a plurality of fields and a signature, the signature formed by encrypting a portion of the fields with a private key associated with a trusted source other than the endpoint, the plurality of fields including at least one unsigned field not in the portion of the signed fields;
verify the signature using a public key corresponding to the private key, the public key associated with the trusted source, the verification of the signature confirming that the identity was authenticated by the trusted source;
send an encryption request to the remote endpoint, the encryption request specifying data and requesting that the remote endpoint encrypt the data with the private key;
receive a response from the remote endpoint;
decrypt the response with the public key;
confirm that the decrypted response is equivalent to the data specified by the encryption request; and
in response to confirming the identity, exchange the real-time media with the remote endpoint.

16. The logic of claim 15, wherein:
the trusted source is a network; and
the identity comprises one of the following at the network: a user name, a phone number, or an -specific identifier.

17. The logic of claim 15, wherein the media initialization message is a SIP invite message containing a SDP body.

18. The logic of claim 17, wherein:
the portion of the fields comprise one or more of the following SIP fields: Contact, Date, Call-ID, CSeq, To, From, a field containing the public key associated with the endpoint, or a fingerprint of the public key associated with the endpoint;
the plurality of fields includes at least one unsigned field not in the portion of the fields, the at least one unsigned field comprising the SDP body; and
a network element modifies the at least one unsigned field after the signature is inserted into the media initialization message.

19. The logic of claim 15, further operable to establish a media session between the remote endpoint and a recipient endpoint through signaling.

20. The logic of claim 15, wherein the identity is confirmed using one of the following protocols: MS, DTLS, ICE, and HIP.

21. A system comprising:
means for receiving a media initialization message requesting a media session for the exchange of real-time media with a remote endpoint, the media initialization message asserting an identity and comprising a plurality of fields and a signature, the signature, formed by encrypting a portion of the fields with a private key associated with a trusted source other than the endpoint, the plurality of fields including at least one unsigned field not in the portion of the fields;
means for verifying the signature using a public key corresponding to the private key, the public key associated with the trusted source, the verification of the signature confirming that the identity was authenticated by the trusted source;
means for sending an encryption request to the remote endpoint, the encryption request specifying data and requesting that the remote endpoint encrypt the data with the private key;
means for receiving a response from the remote endpoint;
means for decrypting the response with the public key; and
means for confirming that the decrypted response is equivalent to the data specified by the encryption request; and
means for exchanging the real-time media with the remote endpoint in response to confirming the identity.

* * * * *